(12) United States Patent
Rich

(10) Patent No.: US 6,362,935 B1
(45) Date of Patent: Mar. 26, 2002

(54) CHAMFERED HEAD FOR ENHANCED LOADING ONTO MEDIA

(75) Inventor: Edward L. Rich, Poway, CA (US)

(73) Assignee: Iomega Corporation, Roy, UT (US)

( * ) Notice: Subject to any disclaimer, the term of this patent is extended or adjusted under 35 U.S.C. 154(b) by 0 days.

(21) Appl. No.: 09/294,513

(22) Filed: Apr. 20, 1999

(51) Int. Cl.[7] ............... G11B 5/60; G11B 15/64; G11B 17/32; G11B 21/20
(52) U.S. Cl. .................................. 360/236.7
(58) Field of Search .................. 360/235.4, 236.5, 360/235.9, 236.7, 235.7, 236.4, FOR 203

(56) References Cited

U.S. PATENT DOCUMENTS

| | | | | |
|---|---|---|---|---|
| 4,673,996 A | * | 6/1987 | White ..................... | 360/236.7 |
| 4,792,874 A | * | 12/1988 | MacDonald, II et al. ..................... | 360/130.34 |
| 4,811,143 A | * | 3/1989 | Ohashi et al. ............ | 360/246.8 |
| 5,019,930 A | * | 5/1991 | Takeya ..................... | 360/235.3 |
| 5,062,017 A | * | 10/1991 | Strom et al. ............. | 360/236.1 |
| 5,926,346 A | * | 7/1999 | Briggs ..................... | 360/266.4 |
| 6,040,959 A | * | 3/2000 | Kobayashi et al. ...... | 360/236.7 |

* cited by examiner

Primary Examiner—William Klimowicz
Assistant Examiner—Julie Anne Watko
(74) Attorney, Agent, or Firm—Woodcock Washburn LLP

(57) ABSTRACT

A read/write head for use in a disk drive having chamfered surfaces reducing possible damage to the head assembly and/or media during loading and unloading of heads form media surface. In an inadvertent collision between the media and head assembly, the media may become displaced, possibly damaging the head suspension assembly or critical electrical connections between the head assembly and media drive. Similarly, such a collision may impart irreversible physical damage to the recording medium, making the data on the medium unrecoverable. The present invention comprises chamfered surface, preferably formed into the head, which reduces the likelihood of damage caused to the head assembly or media in the event of an inadvertent collision. These chamfered surfaces deflect the media to its proper position such that damage is minimized during collision.

17 Claims, 7 Drawing Sheets

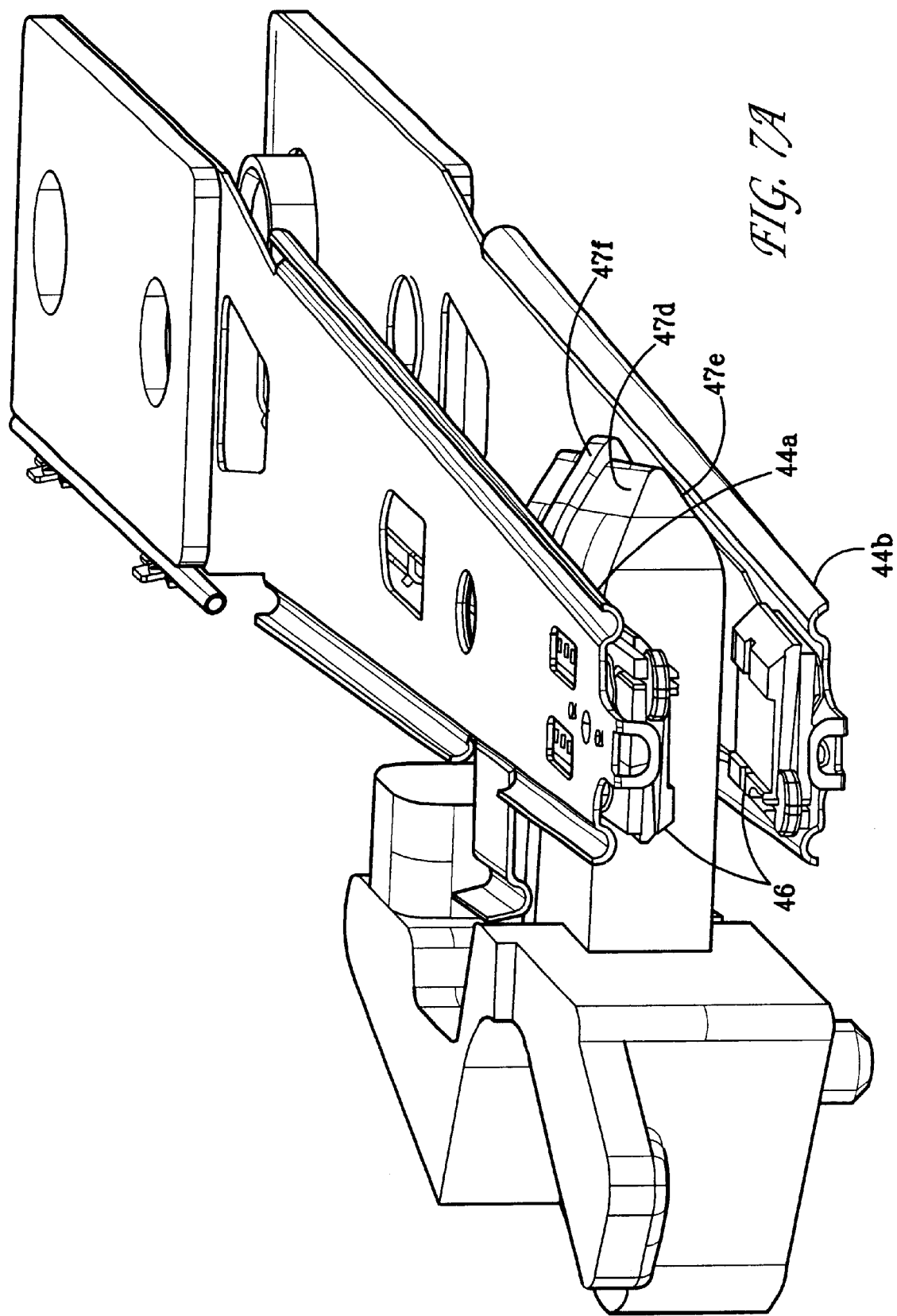

CHAMFERED HEAD FOR ENHANCED LOADING ONTO MEDIA

BACKGROUND OF THE INVENTION

This invention relates to data storage systems. More particularly, the invention relates to chamfered heads used to facilitate head loading/unloading for a disk drive.

A variety of devices that read and write information on a rotating disk medium have been developed and used as computer data storage devices. For example, optical disk drives employ a rotatable optical recording medium for the storage of data. Magnetic medium devices have been and still are the most common computer storage devices. Widely used disk drives are generally available in two broad categories—removable and fixed. In the case of magnetic media cartridges, the medium is generally housed and in the case of optical media, the medium is generally not. By contrast, fixed disk drives read and write information magnetically or optically on a fixed disk that is permanently fixed in the data storage device.

Fixed disk drives are generally used as the principal storage devices of computers, since they typically have data transmission speeds and storage capacities that are several orders of magnitude greater than removable disk drives. Fixed disk drives, however, have the drawback that they cannot be easily transferred to another computer. Hence, computers of today are generally equipped with both a removable cartridge type and fixed type disk drive.

Disk drives for use with both removable disk cartridges and fixed media typically employ either a linear actuator mechanism or a radial arm actuator mechanism for positioning the read/write head(s) of the disk drive on the recording surface(s) of the storage medium, or disk. Since certain media is removable, as in the case with disk cartridges, disk drives are designed such that the linear or radial arm actuator moves off, and away from, the storage medium to a retracted position in order to prevent damage to the head(s) and/or media when such media is inserted and removed from the disk drive. Similarly, actuators found in fixed medium disk drives perform a similar retraction and parking function. This function is generally performed during drive power down to prevent damage to the head(s) and/or media.

Moreover, many removable cartridge disk drives and fixed medium drives employ a plurality of opposing read/write heads for recording and reproducing information on both sides of a storage medium. Typically, the opposing heads are disposed on flexible suspension arms at the distal end of an actuator that allow the heads to fly closely over the respective surfaces of the rotating disk. The opposing heads should be spaced apart as they approach the edge of the disk during a head loading operation in order to avoid collision with the edge of the disk. Similarly, when the heads are unloaded from the disk, they should again be spaced apart to avoid collision with the medium and each other.

Prior art removable media disk drive mechanisms primarily employed load ramps to safely load and unload what are generally squared-off heads from the media during cartridge insertion and ejection. The load ramps, generally found proximate to the edge of the mounted media, separate the read/write heads during the loading/unloading process. For example, during drive power down or removable cartridge ejection, the head/arm assembly moves towards the load ramp and away from the edge of the media. Once proximate to the load ramp, the load arms begin to mount the wedge like load ramp, which physically separates the load arms. Similarly, when the disk cartridge is fully inserted (i.e. the media is fully mounted) or after drive power up, the load arm assemblies, being physically separated by the load ramp, are driven by the actuator off of the load ramp and back towards the media. Thereafter, the heads are permitted to load onto the medium surface. In this way, the load ramp protects the heads and the medium from damage that could result if the heads collided with media during the head loading process.

However, the use of load ramps does not completely preclude damage to the head assembly resulting from an inadvertent collision with the recording media, particularly the edge of the recording media. Prior art removable media disk drive mechanisms typically employ head designs having an essentially squared-off surfaces. The squared-off surfaces readily expose the head assembly to damage in the event of an inadvertent medium edge collision, which is ragged and abrasive. By way of example, during a loading cycle the squared-off head surface may collide with the medium edge stubbing against the high speed, abrasive, ragged surface whereby the medium could for example damage the delicate head suspension, transfer debris to the head, or damage transducer leads. Additionally, physical damage to the medium may result from the described collision, rendering the data on the medium unrecoverable.

Thus, a head design that overcomes the drawbacks of the prior art is desirable. The current invention is directed to providing such a head design.

SUMMARY OF THE INVENTION

The present invention is directed to a data storage device that accepts or contains data storage media. According to one aspect of the present invention, the disk drive comprises an actuator arm assembly having at least one actuator arm, the actuator arm capable of traveling back and forth across the edge of the data storage media. The disk drive further comprises a head assembly mechanically coupled to the distal end of the actuator arm, such that the head assembly travels across the surface of the data storage media and at least one read/write head having a chamfered surface, mechanically coupled to the head assembly, such that said chamfered surface is exposed to the edge of the data storage media during said head assembly travel.

In accordance with an aspect of the present invention, the chamfered read/write head of the head assembly, comprises a base having a substantially planar surface, a top surface parallel to the base and a front surface and back surface attached to the base such that said front surface and back surface are parallel to each other and perpendicular to the base. Additionally, the rear surface comprises an enclave housing a read/write element. Accordingly, the chamfered read/write head also comprises a first and second side surfaces. The first side surface is perpendicularly attached to the base and parallel to the second side surface wherein the first and second side surfaces have a portion with a substantially planar surface and a chamfered portion extending from the planar portion to the top surface.

In accordance with a further aspect of the present invention, the chamfered read/write head additionally comprises chamfered front and back surfaces.

In accordance with a further aspect of the present invention, the chamfered read/write head element comprises at least one of the following group: a magnetic core or laser diode.

In accordance with further aspect of the present invention, the actuator arm assembly travels across the edge of the data storage media, back to and forth from, a load ramp.

BRIEF DESCRIPTION OF THE DRAWINGS

The foregoing summary, as well as the following detailed description of the preferred embodiments, is better understood when read in conjunction with the appended drawings. For the purpose of illustrating the invention, there is shown in the drawings an embodiment that is presently preferred, it being understood, however, that the invention is not limited to the specific methods and instrumentalities disclosed. In the drawings:

FIG. 7A is an isometric view of a arm/head suspension assembly in accordance with the present invention shown in a parked position immediately after unloading from or immediately before loading onto a recording media;

DETAILED DESCRIPTION OF PREFERRED EMBODIMENT

The present invention provides a chamfered head design for use in a disk drive and corresponding exemplary data storage media. Throughout the description, a preferred embodiment of the invention is described in connection with exemplary components. For example, removable media is shown representing the preferred data storage media of the present invention having a particular shape and dimensions, and the drive is shown having a rotary actuator. However, the particular disk drive and media shown are provided only to illustrate the operation of the present invention. Accordingly, the invention should not be limited to removable media or drive embodiment shown as the invention contemplates the application to other kinds and types of media and drive types and configurations.

Figure 1:
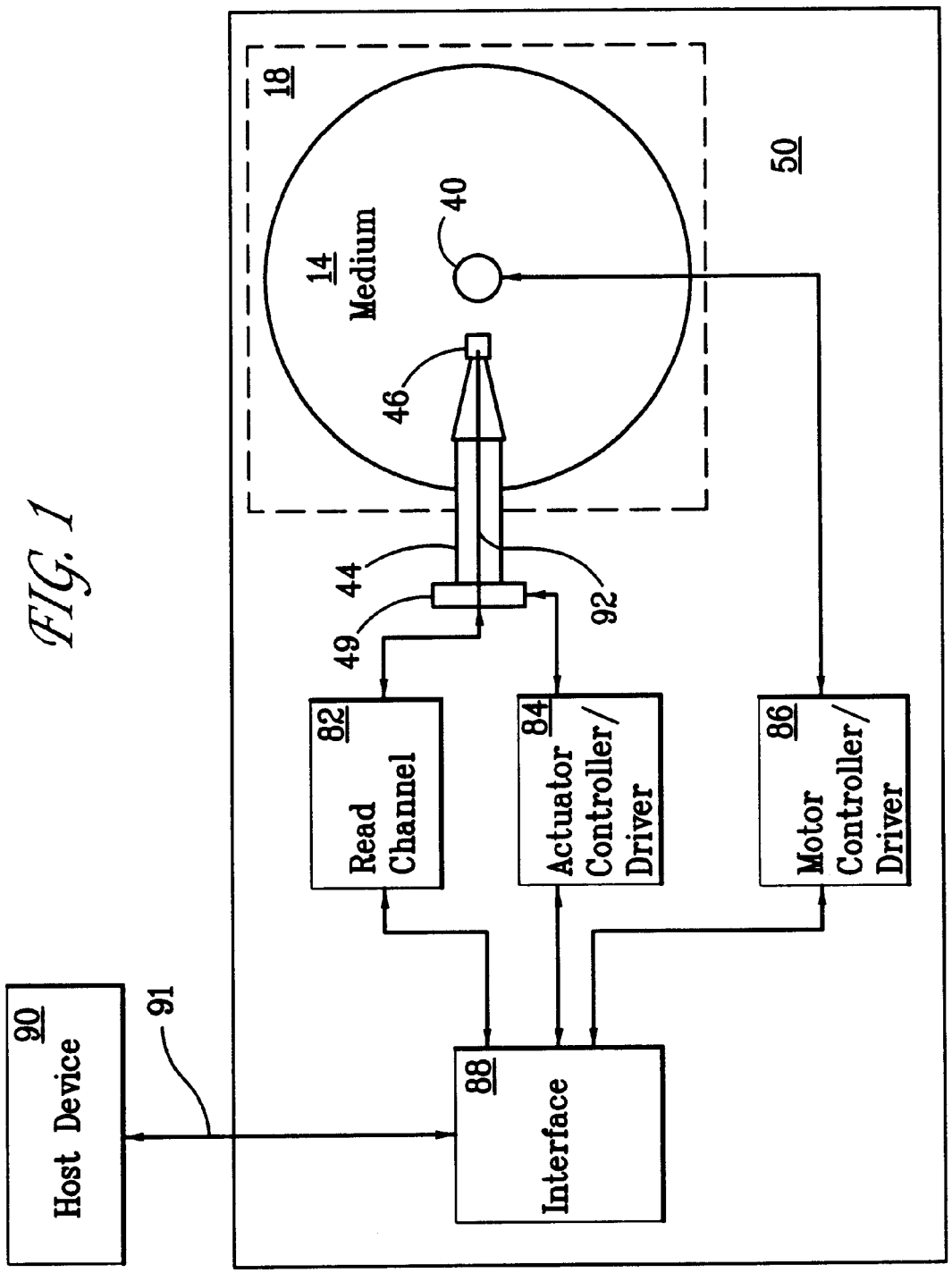
FIG. 1 is a schematic diagram of a disk drive and host computer environment wherein the present invention may be employed.

FIG. 1 is a schematic diagram of an storage drive for storing and retrieving information for a host device. Host device 90 may be one of a number of various types of computer based devices such as a personal computer, a handheld computer, or the like. Host device 90 communicates with drive 50 via bus 91 by sending commands to write or read digital information to or from digital recording medium 14. Bus 90 may be any one of the various buses such as parallel, generic serial, USB, fire wire, SCSI, and so on.

Digital recording medium 14 may be one of any of the various digital data storage media such as magnetic, optical, or magneto-optical. Optionally, medium 14 may be fixed in the drive 50, or alternatively removable from drive 50. Where the medium 14 is removable from drive 50, medium 14 may be encased in an outer shell 18 to protect medium 14 from damage.

Drive 50 comprises a controller 88 that provides an interface with host device 90 as well as controlling the overall operation of Drive 50. Controller 88 is preferably a microprocessor-based controller. Drive 50 also comprises a read channel 82 for conditioning signals read from medium 14; actuator controller 84 for providing servo control and tracking; motor controller 86 for controlling the spin rate of medium 14 via a spindle motor 40, and an actuator assembly for reading the data from medium 14.

The actuator assembly comprises a read/write head 46 that is connected to a distal end of an actuator assembly. The actuator assembly also comprises a suspension arm 44 and an actuator 49 that cooperate to move the read/write head 46 over the surface of medium 14 for reading and writing digital information. Read/write head 46 is electrically coupled to read channel 82 by way of electrical conductor 92.

Actuator 49 comprises an electromagnetic motor, preferably a voice coil motor, stepper motor, or the like. Moreover, actuator 49 may comprise a linear or rotary motion. Linear motion actuators are generally referred to as linear actuators; whereas, rotary motion actuators are generally referred to as rotary actuators.

Figure 2:
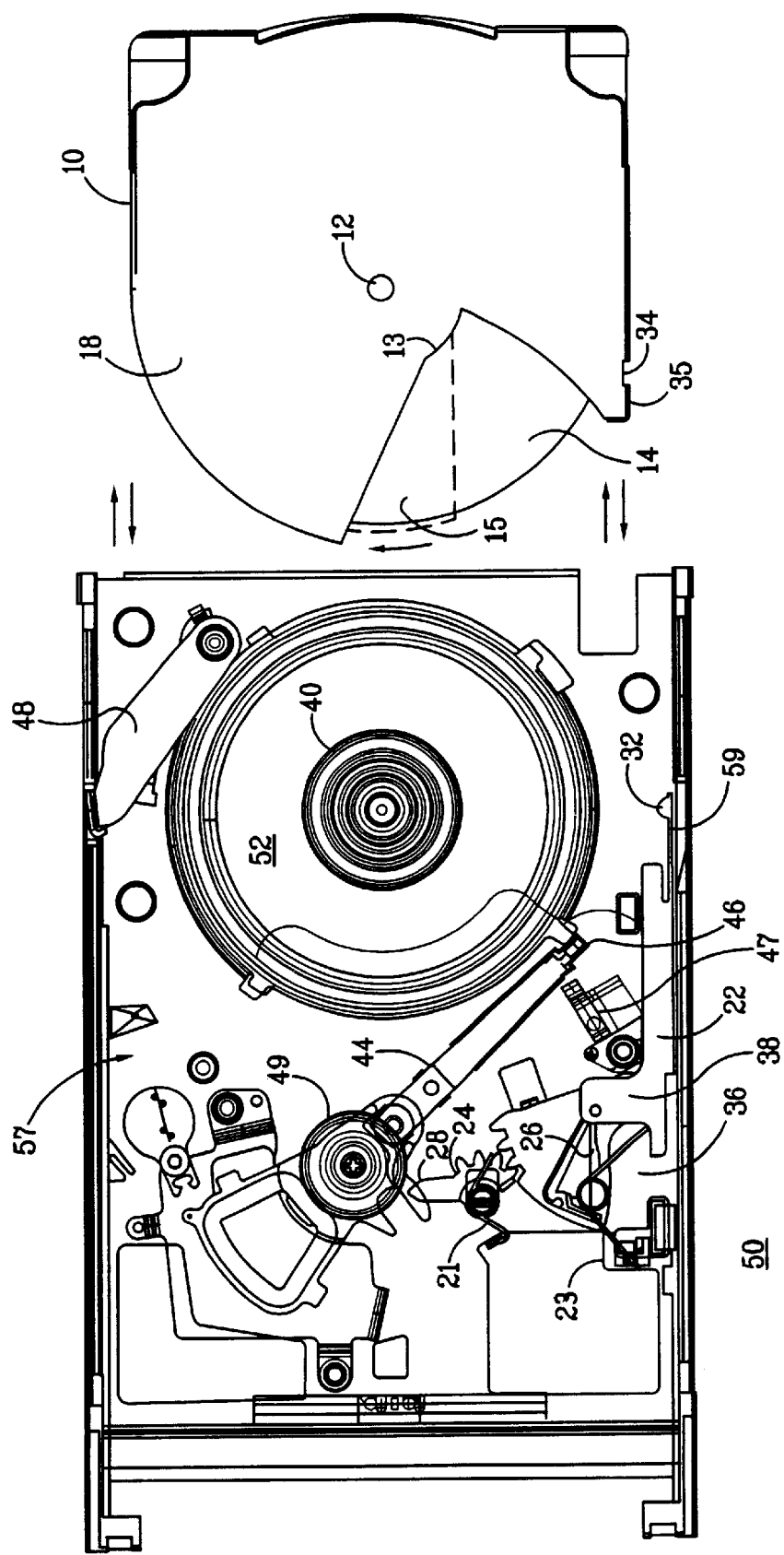
FIG. 2 is a top plan view of a disk drive having an exemplary cartridge in the ejected/pre-insertion position according to the present invention.

FIG. 2 is a top view of an exemplary removable disk drive 50 with its top cover removed and the components moved from relative operational positions for clarity. Drive 50 comprises a chassis 57, an actuator 49, including an opposing pair of load beams 44 having a read/write head 46 disposed at the end of each load beam, a spindle motor 52 and a spindle 40, a load ramp 47, a shutter opening arm 48, and a load/eject mechanism which includes pinion 36, gear 24, sliding lever 22, and lever spring 23. Furthermore, the assembly comprising the read/write heads and the load beams are collectively referred to as the suspension assembly. In accordance with the present invention read/write head 46 comprises a chamfered edge (described more fully below).

Actuator 49 is illustrated herein as a rotary actuator; however, aspects of the present invention are equally applicable to a linear actuator.

As drive technologies advance, disk drives with smaller dimensional tolerances are emerging. For example, drives with thickness on the order of about 5 mm may be desirable in some applications. These small drives create incidental problems related primarily to dimensional tolerances. For example, and as described herein, loading heads onto the medium may be more likely to result in damage if conventional technologies were employed.

Figure 3A:
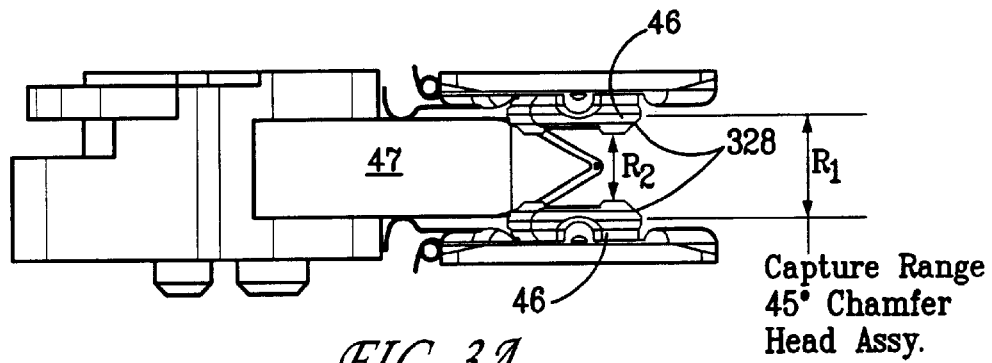
FIG. 3A is a front view of a parked head suspension assembly incorporating aspects of the present invention.
Figure 3B:
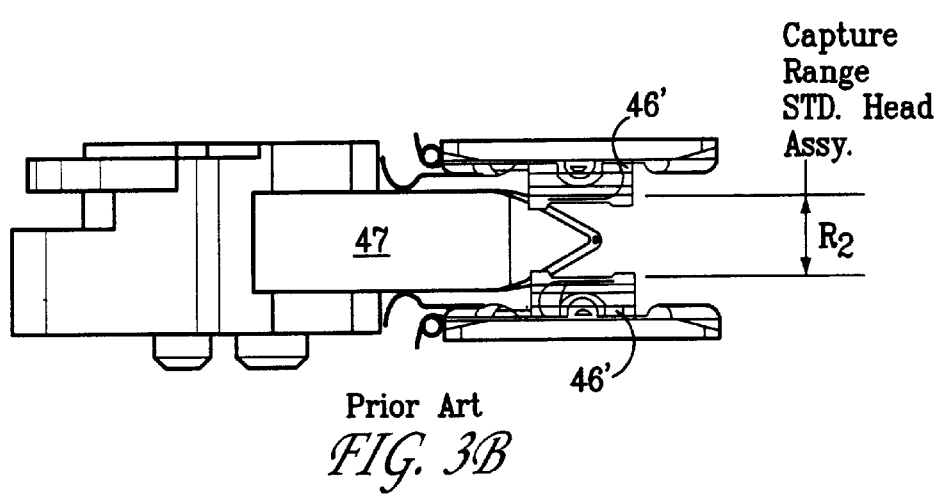
FIG. 3B is a front view of a prior art parked head suspension assembly.

FIGS. 3A and 3B show a head-on view of parked suspension assemblies, comparing a conventional (prior art)

suspension assembly to a suspension assembly in accordance with the present invention. The prior art assembly has a capture range R2 (i.e., the space between heads 46' between which a medium must be loaded). This capture range may become exceeding narrow as the thickness of the drive decreases. For example, PCMCIA standard specify physical dimensions for devices that conform to the specification. PCMCIA type I devices are about 10.5 mm thick, PCMCIA type II devices are about 5 mm thick. Thus, a disk drive conforming to the PCMCIA standards would have a gap between its heads (i.e., a disk capture range) much narrower than drives that do not have to conform to such stringent thickness requirements. For example, in a 5 mm height drive, the disk capture range could be as narrow as about 0.8 mm with a standard head design (e.g., FIG. 3B). In accordance with the present invention, this narrow capture range R2 can be effectively expanded to a range R1 by providing chamfered surfaces 328 on the side of the head 46 facing the medium edge. For example, whereas capture range R2 was in a range of about 0.8 mm for an exemplary drive having a height of about 5 mm, a chamfer angle of about 45 degrees can add about 0.25 mm to the capture range. Thus, by adding a chamfer to each of the top and bottom head can yield a chamfer range of as much as about 1.3 mm.

Although the present invention describes the present invention with reference to chamfered edges on the slider portion of a read/write head, the present invention should by no means be limited to such an embodiment. For example, the chmfered edges could be formed on a separate chamfered structure that is coupled to the head or coupled to the load beam. For example, FIG. 5C illustrates such a chamfered structure 46c comprising chamfered edge 328c. The chamfered structure could be added to a head of the type shown in FIG. 5A or 5B by coupling it to one end of the head 46, 46' such that the chamfered edge extends outward from the head. Alternatively, the chamfered structure 46c could be coupled directly to the load beam separately from the head 46, 46'.

A disk cartridge 10 can be inserted and ejected into the front of the drive in the direction indicated by the arrow. During insertion, the cartridge slides linearly along the top surface of chassis 57 and spindle motor 52 for engagement with the read/write assembly 46. Similarly, when ejected the disk cartridge 10 slides linearly along the top surface of chassis 57 and spindle motor 52 disengaging from read/write assembly 46.

FIG. 2 further shows, disk cartridge 10 comprising a removable recording medium 14, a disk media hub 12, and cartridge shell 18. Recording medium 14 is exposed through a generally wedge shaped disk access opening 13 as cartridge media cover 15 is retracted within cartridge shell 18 during cartridge insertion (as indicated by the arrow). Recording medium 14 is generally circular with a circular hole proximate the center of recording medium 14. Cartridge shell 18 also comprises a side cut-out 34 and abutment surface 35. Cut-out 34 and abutment surface 35 engage sliding lever 22 during cartridge insertion and ejection. Cut-out 34 functions to retain the cartridge in drive 50 and ensure proper cartridge insertion while abutment surface 35 provides a flat surface for engagement and spring loading of sliding lever 22 having a protuberance 32.

During removable drive operation 50, actuator 49 is retracted onto load ramp 47. When disk cartridge 10 is first inserted, sliding lever 22 is released (i.e., biased forward). When the cartridge 10 is full inserted into flexible media drive 50, the actuator 49 is then allowed to move its read/write head 46 across the surface of recording medium 14, reading and writing information. Moreover, spring 23 is loaded to provided an ejection force to cartridge 10 during ejection of cartridge 10 from drive 50.

When cartridge 10 has been pushed far enough into drive 50 such that protuberance 32 engages cut-out 34 in cartridge 10, cartridge abutment surface 35 engages sliding lever 22, which biases spring 23 to provide a force for subsequent ejections. When disk cartridge 10 is properly loaded into drive 50, actuator 49 is free to load heads 46 onto the medium. When a disk is ejected from the drive. Spring 23 biases sliding lever 22 and thereby cartridge 10 out of drive 50. During ejection spring 21 rotates gear 24 counterclockwise and latch 28 moves actuator 49 to a parked position via lever 45. By parking actuator 49, load beams 44 and heads 46 are moved back onto load ramp 47.

Figure 4:
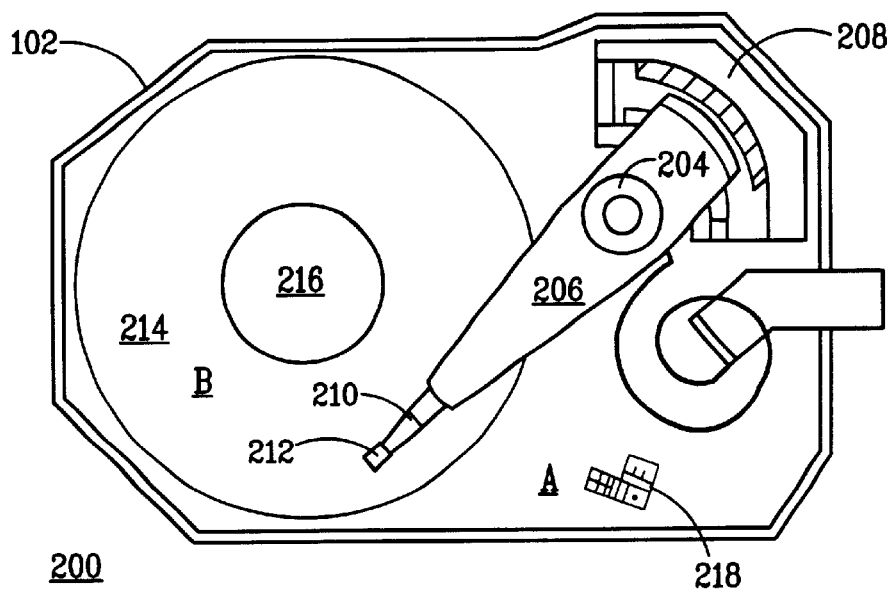
FIG. 4 is a top plan view of a disk drive having fixed recording media.

Comparatively, FIG. 4 illustrates the general components and operation of an exemplary fixed media drive incorporating aspects of the present invention. FIG. 4 shows a top view of fixed disk drive 200 with its top cover removed and the components moved from the relative operational positions for clarity. Drive 200 comprises a chassis 202, a plurality of actuators 204 fixedly disposed to drive chassis 202 through actuator base 208, a plurality of load beams 206 having a read/write head assembly 210 disposed at the end of each load beam. The read/write head assembly 210 having a chamfered read/write head 46 distally disposed such to allow travel across data storage media 214. Fixed data storage media 214 rests on spindle 216, such that fixed data storage media 214 rotates relative to load arm 206 on spindle 216.

During the "power up" operation of fixed drive 200, load beams 206 driven by actuator 204, travel from a rest or parked position "A", proximate to and resting on load ramp 218, to position "B" relative to and atop fixed data storage media 214 surface. At position "B" the chamfered read/write head 212 is allowed to travel across fixed data storage media 214 to read and write desired information. Similarly, during the "power down" operation the above process is reversed. Load beams 206 driven by actuator 204 move from position proximate to position "B" over to position "A" onto load beam 218 placing the read/write head assembly 210 in a parked position.

Figure 5A:
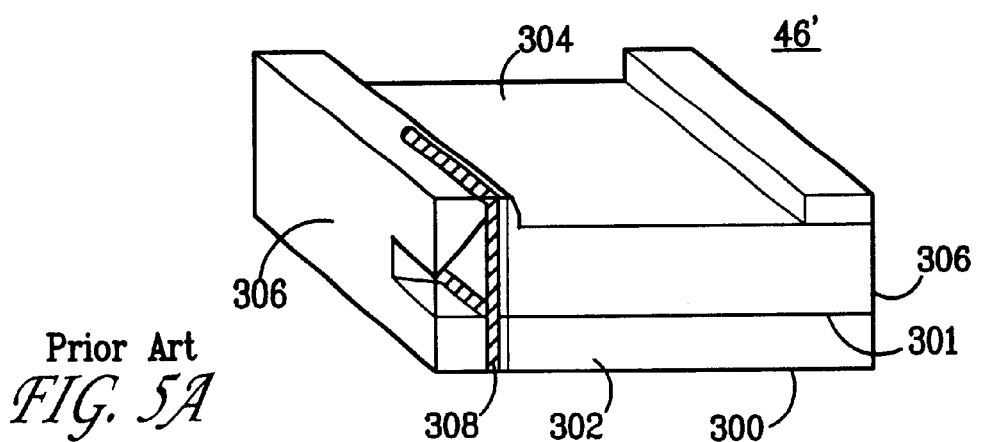
FIG. 5A is a perspective view of a head design consistent with the prior art.
Figure 5B:
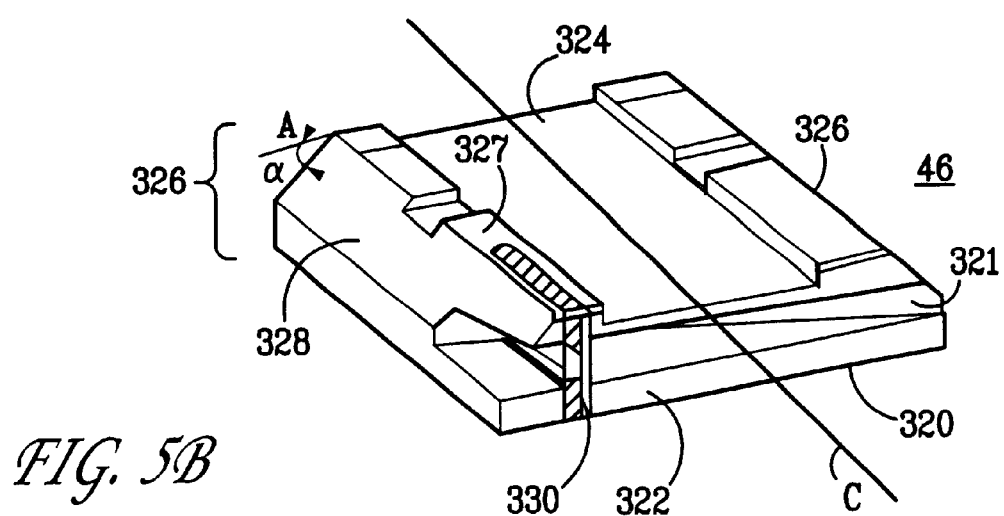
FIG. 5B is a perspective view of a head incorporating aspects of the present invention.
Figure 5C:
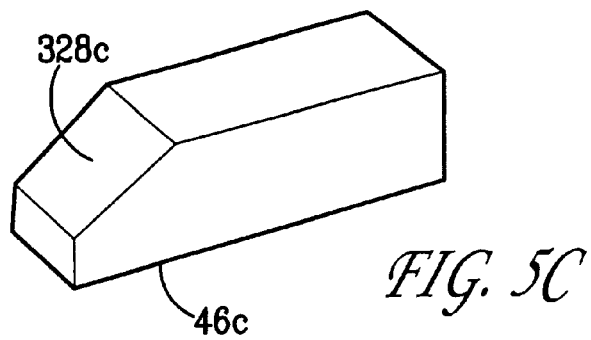
FIG. 5C is a perspective view of an alternative chamfered structure embodiment.

Turning to FIGS. 5A and 5B, the prior art head design and that of the present invention are better described. FIG. 5A shows a prior art read/write head 46'. Head 46' comprises a slider 301 with an embedded read/write element 308. Slider 301 comprises a substantially planar load arm attaching base 300, an air bearing surface 304, substantially squared-off rail-like side surfaces 306, a rear surface 302, and a front surface (not shown). Air bearing surface 304 is substantially parallel to load arm attaching base 300 and perpendicular to rail like side surfaces 306, forming a substantially rectangular prism-like rhomboid. Read/write element 308 is located in one side surface 306 proximate rear surface 302.

By contrast, FIG. 5B illustrates a chamfered read/write head 46 in accordance with the present invention. Chamfered read/write head 46 comprises a slider 321 with an embedded read/write element 330. Slider 321 comprises a substantially planar attachment base 320, a media facing (air bearing) surface 324, rail-like side surfaces 326 having a substantially planar portion 327, a chamfered portion 328 having a chamfer angle α defined by the intersection of line A and chamfered portion 328, a front (not shown), and rear 322. The chamfer angle α for chamfered portion 328 having a range from about five to thirty degrees, but preferably between about five and fifteen degrees. Air bearing surface 324 is substantially parallel to the base 320. Air bearing surface 324, base 320, side surfaces 326, rear 322, and front (not shown) surfaces, essentially form a complex rhomboid. Read/write element 330 is placed proximate to a side surface 326 and front surface 322.

Notably, chamfered read/write head 46 is essentially symmetric about a bisecting line C. In that way, identical read/write heads 46 can be manufactured and used as opposing read/write head pairs in disk drives. In either position (e.g., top or bottom head) read/write head 46 will have a chamfered surface facing a medium edge during a head loading cycle.

Chamfered head 46 acts to prevent certain causes of head damage during head loading cycles. Collisions of head(s) 46 with the edge of medium 14 can cause severe damage to either heads 46, medium 14, or both. Chamfered heads 46 help to minimize resulting damage by guiding misaligned media or accounting for drive manufacturing tolerances wherein the spindle motor and actuator are not consistently positioned relative to one another between drives. The operation and effects of the present invention are best understood by comparing the operation to a conventional design.

Figure 6A:
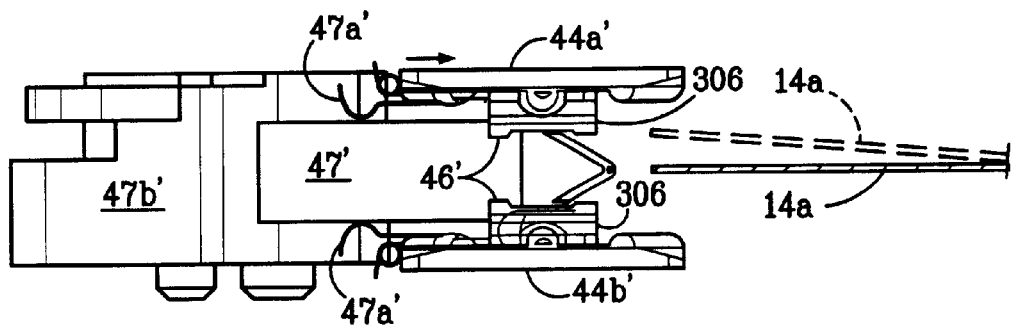
FIG. 6A is a front view of a prior art suspension assembly in a parked position with a medium mounted in the drive.

The interaction between read/write heads 46 and 46' and the recording media is described in reference to FIGS. 6A–6C and 7A–7C. FIG. 6A shows prior art read/write heads 46' during a load cycle onto medium 14a. When the removable recording medium 14a is properly mounted (i.e. media 14a is placed towards the positioned load ramp 47), as indicated in solid lines, heads 46 can begin the load cycle. During the load cycle, load beams 44a' and 44b' driven by actuator 49 (not shown) move away from load ramp 47' guided by guide tabs 47a', which are located proximate a distal end of load beams 44a' and 44b', and ride down ramp 47'. Load beams 44a' and 44b' move in tandem in a direction, as indicated by the arrow, towards, and eventually over, the edge of removable recording medium 14a. After a proper load cycle squared-off read/write heads 46' are positioned above and below the medium 14a writing information to and reading information from recording medium 14a.

Figure 6B:
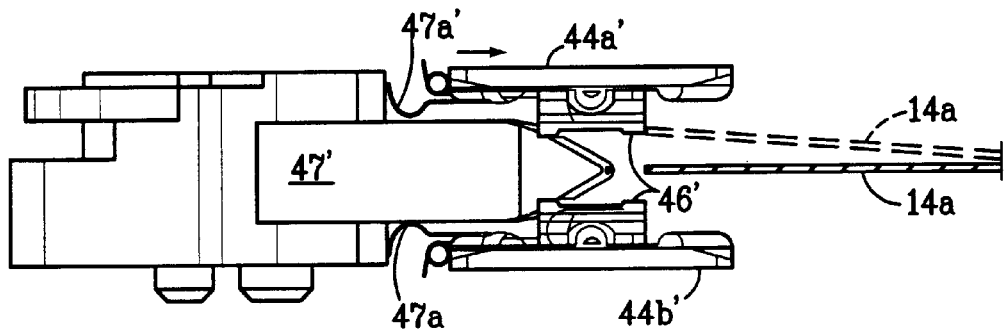
FIG. 6B is a front view of a prior art suspension assembly during a load cycle onto a medium mounted in the drive.
Figure 6C:
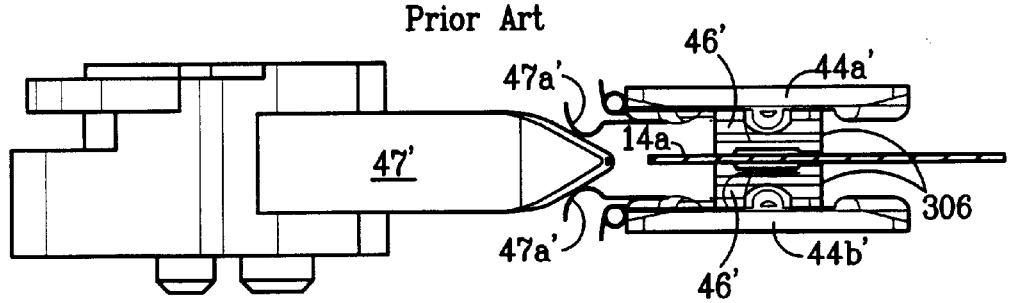
FIG. 6C is a front view of a prior art suspension assembly loaded onto a medium mounted in the drive.

FIGS. 6B and 6C also illustrate the interaction between the squared-off read-write head 46' with the recording medium 14a when the load cycle goes awry. This could occur for a host of reasons such as when the recording medium 14a is improperly mounted, when the drive components are misaligned, or other factors that cause the medium to demonstrate flutter excursions from the nominal position, as shown in phantom lines 14a. As illustrated by phantom lines 14a, when recording medium 14a experiences flutter excursions from the nominal position during the load cycle, the squared-off read/write head 46' could collide with the edge of medium 14a, causing media 14a to ride up (or down) the read/write head 46', squared off side surface 306 and into the head assembly 46' possibly causing damage to the media 14a and/or to the read/write head 46', as indicated in phantom in FIG. 6B. Comparatively, when the medium 14a is not experiencing the flutter excursions, read/write heads 46, do not collide with medium 14a, availing the preferred read/write operation.

Figure 7B:
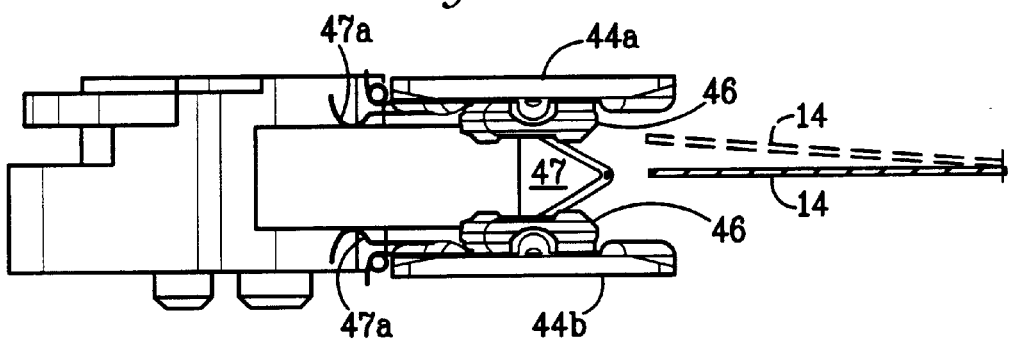
FIG. 7B is a front view of a suspension assembly in accordance with the present invention in a parked position with a medium mounted in the drive.

By contrast to the load cycle of FIGS. 6A–6C, FIGS. 7A–7D illustrate the load cycle of read/write heads 46 onto medium 14 wherein an outer edge of the read/write head has been chamfered. FIG. 7A shows an isometric view of actuator 49 in the parked position on load ramp 47. FIG. 7A shows load beams 44a and 44b having read/write head assemblies 46 with chamfered read write heads 46. When loading from the parked position or when unloading, load beam guide tabs 47a act to guide the load beams 44a and 44b away from or towards the load ramp 47 along raised portion 47f of ramps 47d and 47e. As described above, after cartridge IO is inserted and medium 14 is fully mounted, actuator 49 is free to move over medium 14 read and writing data.

Figure 7C:
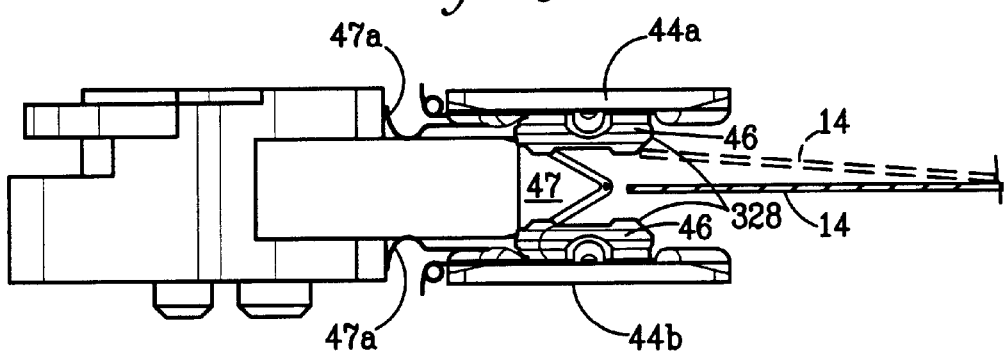
FIG. 7C is a front view of a suspension assembly in accordance with the present invention during a load cycle onto a medium mounted in the drive.
Figure 7D:
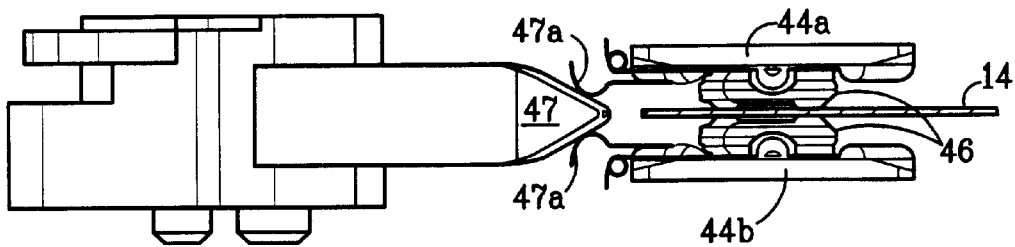
FIG. 7D is a front view of a suspension assembly in accordance with the present invention loaded onto a medium mounted in the drive.

FIGS. 7B–7D indicate the travel of load beams 44a and 44b having chamfered read/write heads 46 during a load cycle onto medium 14. Similar to the load cycle of FIGS. 6A–6C, FIGS. 7B–7D illustrate how load beams 44a and 44b move chamfered read/write heads 46 from the parked position toward medium 14. However, by contrast to FIGS. 6A–6C, the chamfered read/write heads capture medium 14 that is experiencing flutter excursions and protect the suspension assembly from damages that could result from collisions with medium 14.

As illustrated, heads 46 come off of load ramp 47 guided by guide tabs 47a and ride ramps 47d and 47e toward medium 14. When recording medium 14 is in a nominal position as indicated by solid lines in FIG. 5B, load arms 44a and 44b are free to travel across the surface of medium 14 without disturbance, which avails the preferred read/write operation by the chamfered read/write heads 46. On the other hand, if recording media 14 is experiencing flutter excursions as indicated in phantom lines 14, also shown in FIG. 7B, the traveling chamfered read/write heads 46 may collide with the edge of medium 14 as indicated in phantom lines 14 in FIG. 7C. However, here, during a collision, chamfered portion 328 of chamfered read/write head 46, captures medium 14 and directs it between heads 46, such that medium 14 rides along the chamfered portion 328 of chamfered read/write head 46 to an operable position as indicated in FIG. 7D. As illustrated in FIG. 7D, not only was a damaging medium edge collision avoided, but also medium 14 has been captured for use.

In fixed drive 200 operation, the load arm 206 carrying the read/write head assembly 210 and correspondingly the chamfered read/write heads 46 function in a similar fashion. For example, chamfered read/write heads 46, may load onto the medium during fixed drive 200 "power up" and may park during "power down" functions. Similar to removable drive 50 operation, the chamfered read/write head 46 aims to minimize damage to head assembly 210 and to recording media 214 in the event of an inadvertent collision between the chamfered read/write head 46 or the head assembly 210 and the recording media 214.

The above description of preferred embodiments is not intended to impliedly limit the scope of protection of the following claims. Thus, for example, except where they are expressly so limited, the following claims are not limited to applications involving the particularly read/write element disclosed and described. Other read/write elements could be equally applicable such as thin film, magneto-resistive, or optical, including laser diode heads.

What is claimed is:

1. A disk drive of the type accepting a flexible, removable data storage medium, comprising:

an actuator arm assembly having at least one actuator arm, said actuator arm capable of traveling back and forth across the edge of said data storage medium;

a read/write head mechanically coupled to a distal end of said actuator arm;

at least one chamfered surface proximate said head and coupled to said actuator arm, wherein the chamfered surface is exposed to the edge of said data storage medium during at least a portion of said actuator arm assembly travel, said chamfered surface acting to capture said medium when said medium experiences flutter excursions.

2. The disk drive recited in claim 1 wherein said chamfered surface is formed in said read/write head wherein said read/write head further comprises:

a base having an air bearing surface;

a read/write element proximate one end of said base wherein said chamfered surface extends along one side of said head.

3. The drive recited in claim 2 wherein said chamfered read/write head comprises chamfered surfaces along two sides.

4. The drive recited in claim 2 wherein said read/write element comprises at least one of the following group: a magnetic core, a magneto resistive, a thin film, and a laser diode.

5. The drive recited in claim 2 wherein said chamfered read/write head is mechanically coupled to said actuator arm assembly at said base.

6. The drive recited in claim 1 wherein said actuator arm assembly comprises a pair of opposing actuator arms.

7. The drive recited in claim 1 wherein said actuator arm assembly travels across the edge of said data storage medium to and from a load ramp.

8. The drive recited in claim 1 wherein said data storage medium comprises at least one of the following group: magnetic data storage medium and optical data storage medium.

9. The drive recited in claim 1 wherein said actuator arm assembly comprises a rotary actuator.

10. The drive recited in claim 1 wherein said actuator arm assembly comprises a linear actuator.

11. The disk drive as recited in claim 1 wherein the drive type conforms to a thickness of between about 5 mm and about 10.5 mm.

12. A method for preventing head damage in a data storage drive of a type accepting a flexible, removable data storage medium, comprising the steps of:

a) providing a load beam movably within said data storage drive for moving a read write head over said medium;

b) coupling a chamfered surface either to said load beam or to said read write head, said chamfered surface positioned such that said chamfered surface deflects said medium into a proper position during a head loading cycle when said medium is demonstrating flutter excursions.

13. The method as recited in claim 12 wherein said chamfered surface comprises a surface of said head.

14. The method as recited in claim 12 wherein said chamfered surface comprises an angle in a range of about 5 to about 60 degrees.

15. The method as recited in claim 14 wherein said angle is about 45 degrees.

16. The method as recited in claim 12 wherein said load beam is movable in a rotary fashion.

17. The method as recited in claim 12 wherein said load beam is movable in a linear fashion.

* * * * *